US007890381B1

(12) United States Patent
Lyskovsky et al.

(10) Patent No.: US 7,890,381 B1
(45) Date of Patent: Feb. 15, 2011

(54) INTERFACE FOR MANAGEMENT OF COMPUTER GAMES

(75) Inventors: Alexander Lyskovsky, Novosibirsk (RU); Pavel V. Shestak, Novosibirsk (RU)

(73) Assignee: Alawar Entertainment, Inc., Alexandria, VA (US)

( * ) Notice: Subject to any disclaimer, the term of this patent is extended or adjusted under 35 U.S.C. 154(b) by 818 days.

(21) Appl. No.: 11/857,549

(22) Filed: Sep. 19, 2007

(51) Int. Cl.
*G06Q 30/00* (2006.01)
(52) U.S. Cl. ...................................................... 705/26
(58) Field of Classification Search .................. 705/26, 705/27
See application file for complete search history.

(56) References Cited

U.S. PATENT DOCUMENTS

2008/0261699 A1* 10/2008 Topham et al. ............... 463/42

* cited by examiner

*Primary Examiner*—Mila Airapetian
(74) *Attorney, Agent, or Firm*—Bardmesser Law Group

(57) ABSTRACT

A system for managing computer game activities, includes a software module for interfacing to a user and receiving commands from a user; a plurality of games, each game including a wrapper that controls DRM aspects of a user's access to the games; a plurality of skins stored in a local cache on a computer, the skins controlling visual aspects of presentations of the games, each skin being associated with a distributor who provided a particular game to the user. The software module periodically contacts a first server to update skins, games and user settings. The user settings are stored on the first server and permit the user to play the games from another computer. At least one of the games was downloaded from a second server, and the skin corresponding to that game is associated with the second server. The software module provides a mechanism for paying for games. The wrapper restricts the user to playing only a trial version of the game, unless the user pays for the full version of the game. The software module provides a mechanism for adding games that were previously installed to a list of games associated with the software module. The added games are handled the same as games that were downloaded through the software module. The skins include any combination of customizable fonts, colors, logos, text, and window shape. The software module periodically contacts the first server to receive updates and additional features for the games.

20 Claims, 7 Drawing Sheets

INTERFACE FOR MANAGEMENT OF COMPUTER GAMES

BACKGROUND OF THE INVENTION

1. Field of the Invention

The present invention is related to computer games, and more particularly, to technology that provides an interface between a user and a game distributor, as well as to simplifying, for the user, various aspects of downloading and, using, and paying for software games.

2. Background Art

One of the issues that has been present in the field of computer games since their inception is useability of the games, and making it as easy as possible for a user to download new games, pay for the use of the games, updating of the games, and so on. One of the practical realities of the computer game industry is that most game developers are relatively small players, often with only one or two titles that they publish. The games are often sold by various distributors, or aggregators, who themselves usually do not create the actual games, but rather make money on commissions from sales of the games. These distributors are often, though not necessarily, large portals or very popular websites, such as YAHOO, ALAWARE, GOOGLE, REAL ARCADE, BIGFISH GAMES, OBERON MEDIA, IWIN, WALT DISNEY and others. Another "fact of life" of the computer game industry is that frequently, the same game is available from multiple distributors, sometimes for different prices, sometimes on different terms, and so on. Each game distributor, however, would like to "tie" the user to his product and his website as closely as possible.

Accordingly, there is a need in the art for a system and method for simplifying the user side of the process that relates to games, particularly such activities as purchasing, installation, updates, and so forth.

SUMMARY OF THE INVENTION

The present invention is directed to a system, method and computer program product for an integrated interface related to management of various administrative aspects related locally installed computer games that substantially obviates one or more of the problems and disadvantages of the related art.

In one aspect, there is provided a system, method and computer program product for managing computer game activities, including a software module for interfacing to a user and receiving commands from a user; a plurality of games, each game including a wrapper that controls Digital Rights Management aspects of a user's access to the games; a plurality of skins stored in a local cache on a computer, the skins controlling visual aspects of presentations of the games, each skin being associated with a distributor who provided a particular game to the user; wherein the software module periodically contacts a first server to update skins, games and user settings. The user settings are stored on the first server and permit the user to play the games from another computer. At least one of the games was downloaded from a second server, and the skin corresponding to that game is associated with the second server. The software module provides a mechanism for paying for games. The wrapper restricts the user to playing only a trial version of the game, unless the user pays for the full version of the game. The software module provides a mechanism for adding games that were previously installed to a list of games associated with the software module, and wherein the added games are handled the same as games that were downloaded through the software module. The skins include any combination of customizable fonts, colors, logos, text, and window shape. The software module periodically contacts the first server to receive updates to the games. The software module periodically contacts the first server to receive additional features for the games.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
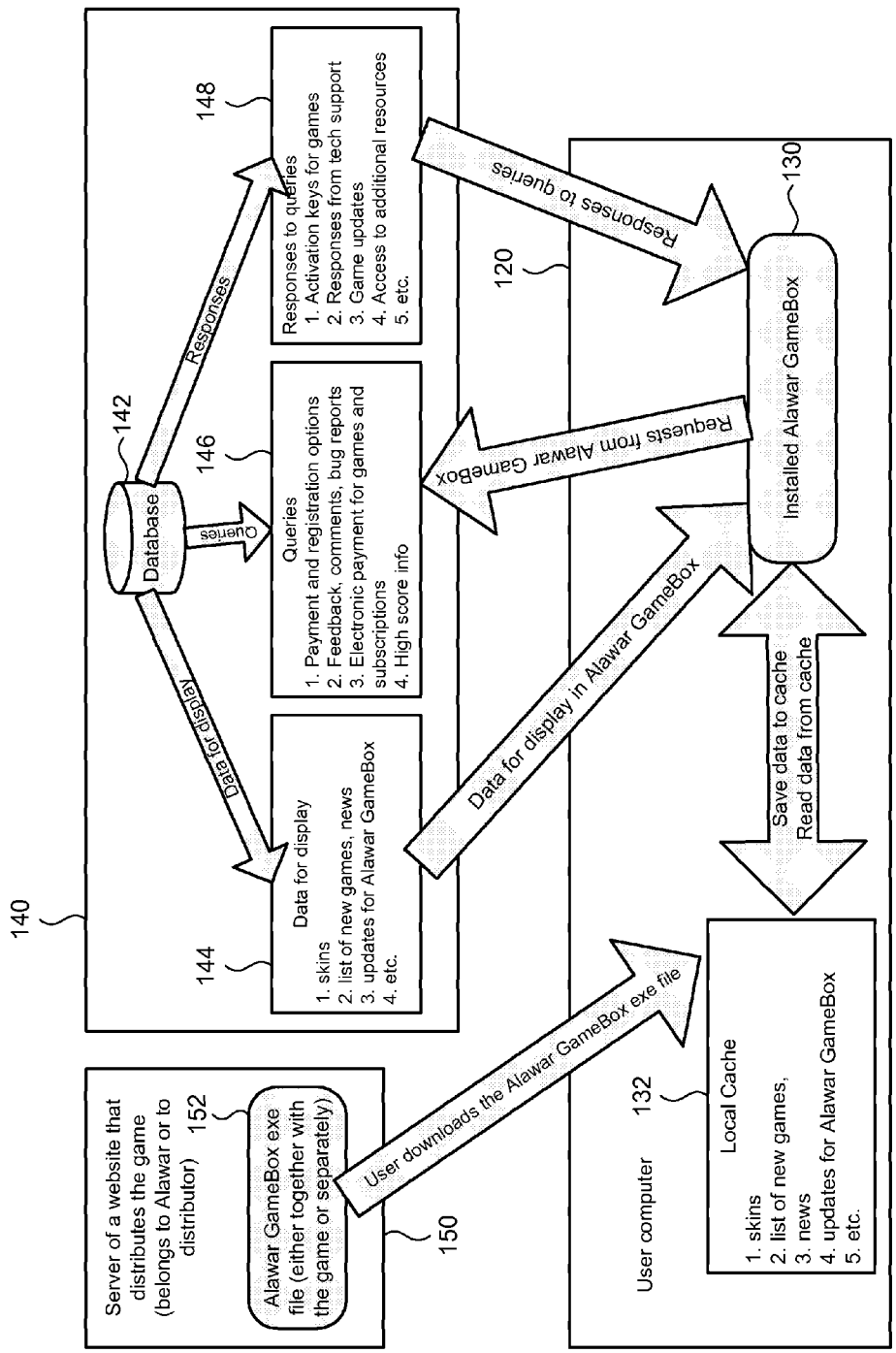
FIG. 1 illustrates an exemplary system architecture according to one embodiment of the invention.

Reference will now be made in detail to the embodiments of the present invention, examples of which are illustrated in the accompanying drawings.

In the description below, the term "Alawar GameBox" will refer to a software application that permits simplifying the process of buying computer games, updating games, installation and launch of the games, and so on, as far as the end user is concerned.

A "wrapper" is technology that is used together with the distributed executable file of the game, together with DRM (digital rights management), and is typically used for restricting the trial period for the game, or other rights available to the user under the license terms of the game software.

The primary objective of these technologies is to make all the activities associated with the "administrative aspects" of the computer games (as opposed to the actual playing of the games) as easy and painless as possible, for the user. Furthermore, the technology described herein permits additional opportunities for the game distributors to advertise other products to the same user, to advertise additional features relating to games that have already been purchased by that user, to provide the user with additional information, such as relevant links to websites, links to technical support, and so on.

An important feature of the ALAWAR GameBox is an ability to provide different skins to the GameBox, and, therefore, different ways in which the user can see the various features of the GameBox, depending on how the game "arrived" on the user's computer. Generally, there are several ways that a game can appear on the computer. One way is for the user to download the game, together with their ALAWAR GameBox and the wrapper, from a distributor. Another way is to download it from a different server, such as ALAWAR's server, even though to the user, normally, this would be transparent, or in any case irrelevant. The user does not usually care how his download request is redirected, but only that the game that he seeks to download is actually downloaded. As yet another alternative, the user can purchase a CD ROM or some other recording medium, on which the ALAWAR GameBox, the wrapper and the game are also provided as an integral whole.

Thus, when a copy of the game appears on the user's computer, it is associated with a particular vendor. As such, a particular skin is used to display the graphical elements relating to the game. This can include things like window borders, colors, fonts, trademarks, logos, distributor-specific advertisements, links to distributor website, links and/or other information relating to technical support, and so on—in other words, any visual, graphical, or other types of displayable information that a particular game distributor might want to customize.

Additionally, using the DRM in the wrapper, the GameBox provides control over the length of time that the game can be played, if the game at issue is a trial version. Furthermore, the GameBox provides an interface for the user to pay for the game, either by purchasing it outright, or by purchasing a certain amount of time, and so on. As yet a further option, the user can pay for a particular number of games, such that the user can play any N games during a particular time period, even though the number of games that the user actually has installed under control of the ALAWAR GameBox can be much larger than N. This also provides a conduit to get the user accustomed to at least trying some game that he otherwise might not. Also, it provides an opportunity for the user to play trial versions of the game, as opposed to possibly more feature-rich versions.

Other information that can be provided to the user using the skin can include information about the new games, information about updates, launching of games, launching of trial versions, payment information and payment interface, and so on.

Additionally, the graphical information that relates to the skin can be updated over time, for example, where the distributor changes logos, fonts, and similar types of information that the distributor would like the user to see. As one embodiment, the ALAWAR GameBox can periodically (for example, once a day) contact the ALAWAR server, and the server can compare the settings in the ALAWAR GameBox of the user with information that the server has stored in a database. Based on that comparison, the server can then decide whether there is any "new stuff" that needs to be downloaded to the user—for example, the information discussed earlier, such as updates, new games, advertising, and so on.

Also, for existing games, the user can be provided with options for purchasing new levels, news regarding the games, access to various online activities, such as forums, blogs, and so on.

From the user's point of view, the user generally engages in the following activities regarding computer games:
(1) Learn about a new game;
(2) Download the game;
(3) Try playing the game;
(4) If the user likes the game, then purchase it/register the game;
(5) Play the game for some period of time;
(6) After the user is tired of the game, look for new games, or look for additions and other features for the purchased game.

To address these activities, the GameBox works with the following information:
(1) A list of installed games;
(2) List of new games that are available for download (that have not yet been downloaded)
(3) Visual appearance of the game (i.e., the skin);
(4) All data downloadable from the Internet, that is available in cached form, such as game ratings (e.g., top 10 games, high score tables, help files, user profile parameters, etc.).

Thus, the objective is for the user to be able to perform all of the above operations through the ALAWAR GameBox. Typically, the ALAWAR GameBox will appear on the user's computer when the user computer downloads a particular game that includes the GameBox, and installs that game. From that point forward, all games associated with the Alawar GameBox either on the users' computer, or on the server for downloading, will have their operations performed through the ALAWAR GameBox.

As an alternative, the ALAWAR Gambox can be downloaded as a standalone application, without downloading it as part of a game. Once activated, the Alawar GameBox will perform the same functions as if it were downloaded together with a game.

The following actions are available to the user through the ALAWAR GameBox:
A. For the already installed games:
 1. Checking a list of already installed games, including such information as game title, general game topic or theme or genre, game description, etc.
 2. Remaining trial time for each installed game
 3. Ability to launch the game
 4. Ability to purchase and/or register the game
 5. Additional game information, such as table of high scores, championships and contests for multiplayer games, prizes for high game scores (for example, in the form of free access to either resources, such as higher levels in the game, new games, etc.)
B. For games that are not installed on the user's computer:
 1. The Alawar GameBox includes a start page (a games guide) on which announcements regarding the games can be displayed, news can be shown, a list of new and top rated games can be displayed, and so on. Information on this page can be refreshed as frequently as marketing policy requires it.
 2. Reviewing a list of games that are available for download. For each game, the following information can be provided: title, genre, brief description, long description, link to a download site, link to screenshots, link to game discussion or game renews, etc.
 3. Upon selection of a particular game from a list, the GameBox shows a more complete description of the game, one or more screen shots, the file size to be downloaded, price, restrictions for the trial version, etc.
 4. Loading a game from the ALAWAR GameBox—upon request from the user, the ALAWAR GameBox initiates the download process, including an onscreen download indicator, support for additional downloads (e.g., if an earlier download was interrupted) and so on. Once the game is downloaded, the Alawar GameBox then proceeds to install the game.

The user can also use the ALAWAR GameBox for paying for the games, including an ability to purchase a single game, an ability to purchase a subscription for several games, optionally on various different terms, such as a subscription for a particular number of games, discounts, and so on.

Also, the ALAWAR GameBox provides for a subscription to news forums, periodicals, and so on.

The ALAWAR GameBox also can have the following optional components and features:

1. The ALAWAR GameBox can launch not only games that were downloaded after the ALAWAR GameBox was installed, but also games that were installed on the user's computer earlier. For example, the user can indicate, using a mouse, that a particular previously installed game should be added to the ALAWAR GameBox. Alternatively, the GameBox can itself look for games on the hard drive and add these games to the list.

2. The ALAWAR ar GameBox can be used to show advertising, both in association with a game, and separate from the games themselves.

3. The ALAWAR GameBox can support community activities (chats, blogs, forums, tech support, etc.)

4. The ability to pay for the games whether on a one time basis, on a subscription basis, on the basis of "renting" a game for a particular time period, licensing, "renting" access to a particular number of games during a specified time period, etc.

5. The ALAWAR GameBox can be adapted to any screen resolution

6. The ALAWAR GameBox can include a tutorial for working with it

7. The ALAWAR GameBox can check whether the hardware and system requirements for the particular game are met by the user's computer, prior to start of the game.

8. The ALAWAR GameBox can also communicate user profile information to the server. This can permit the user to play his favorite online games from any computer connected to the Internet.

9. The ALAWAR GameBox can present a catalog of online games, with an ability to play at least some of them, or to play at least some games with at least some of the features, though not necessarily all the features, even when the computer is offline.

10. A small "lightweight" installer for the ALAWAR GameBox can first be downloaded, where after installation, the remainder of the Alawar GameBox can be downloaded and installed.

11. The ALAWAR GameBox can include audio and video components for interfacing to the user.

12. The ALAWAR GameBox can have an integrated interface to live journal and other log type resources, including avatar support, information links to live journal based on the state of the ALAWAR GameBox (for example "I'm playing game X right now," "my list of high scores in game Y", "my favorite games", and so forth).

13. The ALAWAR GameBox can also include support for patches and updates for those games that the user has installed as part of the GameBox.

14. Support for skins, and an ability for the user to individually configure the visual parameter of the skins.

15. Provision of user feedback (comments, questions, bug reports), with further forwarding to technical support resources.

16. ESRB ratings and parental control.

The ALAWAR GameBox settings are provided from a server. Generally, the information is divided into two categories:

1. Data about the games, which is provided in the form of an XML file.

2. Data about visual presentation, which is presented in the form of a skin. The skin is composed of a basic HTML templates, with a set of images and styles, as well as a set of XML templates.

(a) At each launch, the ALAWAR GameBox checks with the server whether new versions of the installed games (and/or new versions of the GameBox itself) are available on the server (provided there's access to the internet). If a new version is available, the Alawar GameBox offers the user an option to download and install the new version.

(b) Updating of information from the server (e.g., from the distributor's server, or from the GameBox server)

(c) Integration of ALAWAR GameBox with distributor software, where the server stores information regarding each distributor (logo, name, site, etc.), which can be used to automatically generate a skin. The distributors can also access the database and change their parameters and the skins associated with them, and how the GameBox will present their games.

(d) The ALAWAR GameBox supports skins, as noted earlier. The appearance of the skins can be customized for each distributor, and the Alawar ALAWAR GameBox permits changing the text, data, icons, title, and other visual elements, as described earlier for each distributor. Also, different settings can be used for different distributors and for different games provided by each distributor.

(e) Localization, including geographic and language customization.

(f) Support for relatively slow internet connections. All downloadable data, including images, are cached.

(g) The ALAWAR GameBox supports an ability to sort the game list, based on both simple and relatively complex criteria, such as ratings by players, genre, price, sales rankings, games bought together, special promotions, discounts, etc.

(h) The ALAWAR GameBox also supports a feature for continuing download after interruption of the connection, as well as support for simultaneous download of several games.

Note also that the skins can be controlled from the server, or the ALAWAR GameBox periodically contacts the server to, among other things, check for any updates to the skins. If an internet connection is not available, skins can also be updated or changed from a local cache. The ALAWAR GameBox can also create individualized skins for each distributor, and this can be done both manually and semi-automatically, for example, based on templates.

Generally, the ALAWAR GameBox settings can include such parameters as:

A. List and location of previously installed games;

B. Personal information about the user, such as email address, name, etc.;

C. Operating system settings;

D. Distributor information, through which the ALAWAR GameBox would download it to the user.

FIG. 1 illustrates an overall system architecture, according to one embodiment of the present invention. As shown in FIG. 1, a user computer 120 includes an installed ALAWAR GameBox 130. A local cache 132 stores information about skins, any news, updates for the ALAWAR GameBox, list of new games, and so on. The Alawar GameBox also communicates with ALAWAR's server 140. The server 140 includes a database 142. The database stores information about visual aspects of the games, see element 144, which can include skins, lists of new games, news, updates and patches for the ALAWAR GameBox and so on. Queries 146 that can be submitted to the database can include payment and registration options, feedback, comments, bug reports, various aspects regarding electronic payment for games, subscriptions, high score information for a particular user, for this user, for other users, or for all users that play a particular game, especially if the game at issue is an online game.

The server 140 can generate a set of responses 148. These can include activation fees for the games, tech support responses, game updates, as well as access to additional resources.

Also shown in FIG. 1 is a distributor server 150, from which the user can download the distributive. The distributive can include the executable file for the game, the ALAWAR GameBox, the wrapper that encloses the game, and which is directed to digital rights management issues, and so on. These can be downloaded as an integral package, or separate items.

Figure 2:
FIG. 2 shows a screenshot of the ALAWAR GameBox main window.
Figure 3:
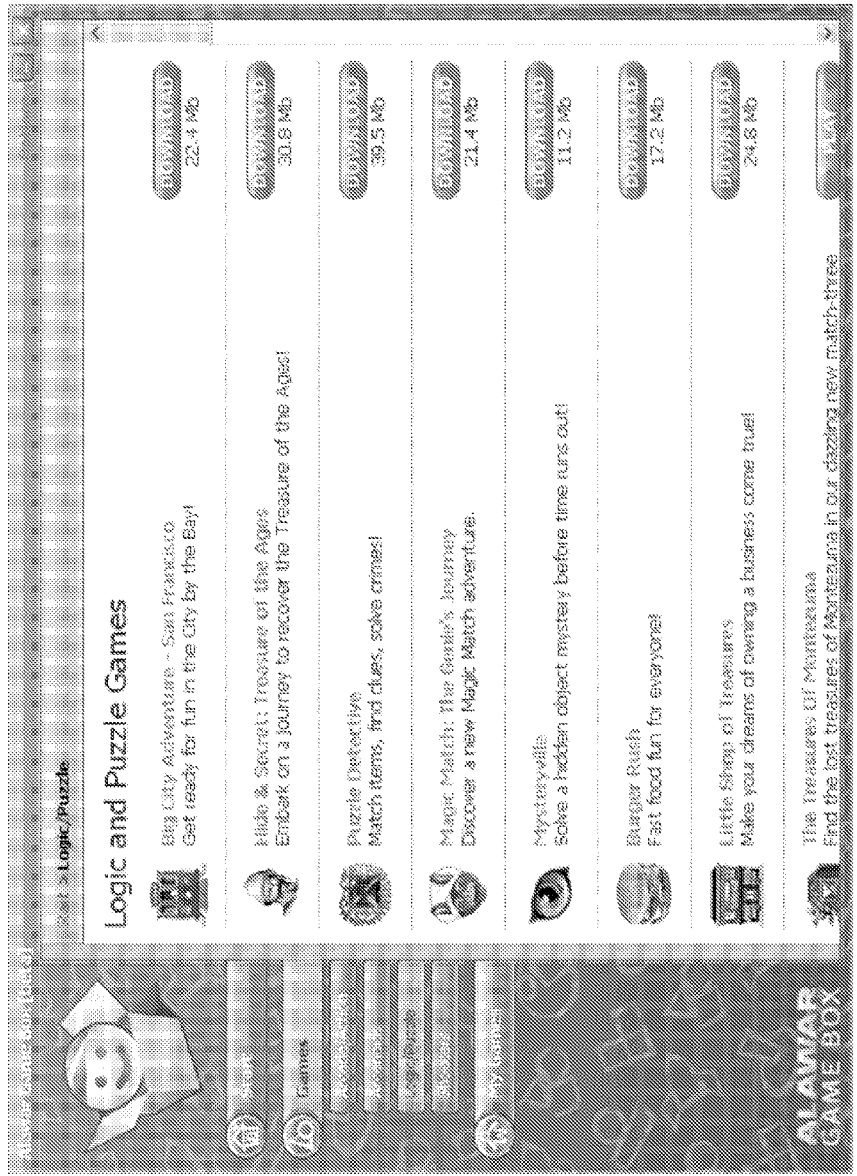
FIG. 3 shows a window that lists games.
Figure 4:
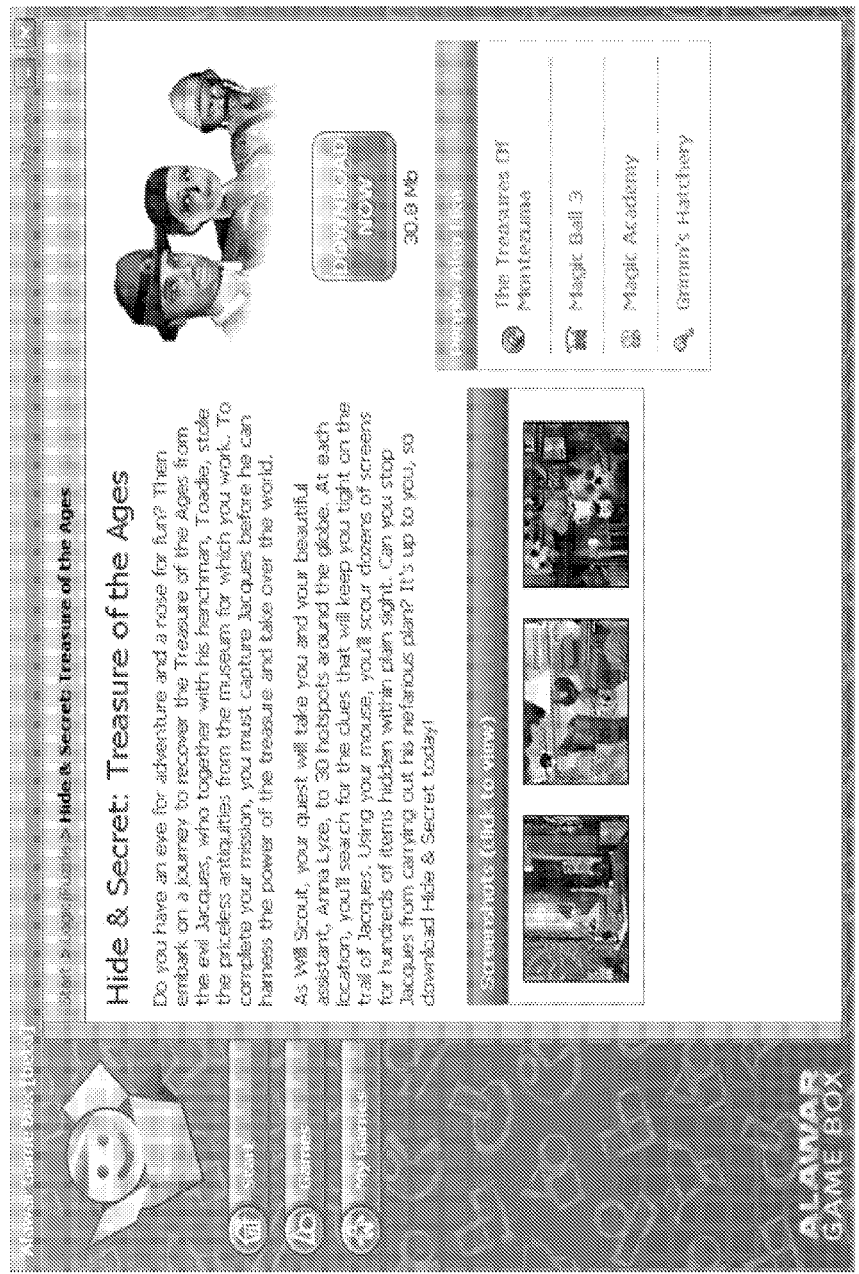
FIG. 4 illustrates an ALAWAR GameBox window with detailed information about a game.
Figure 5:
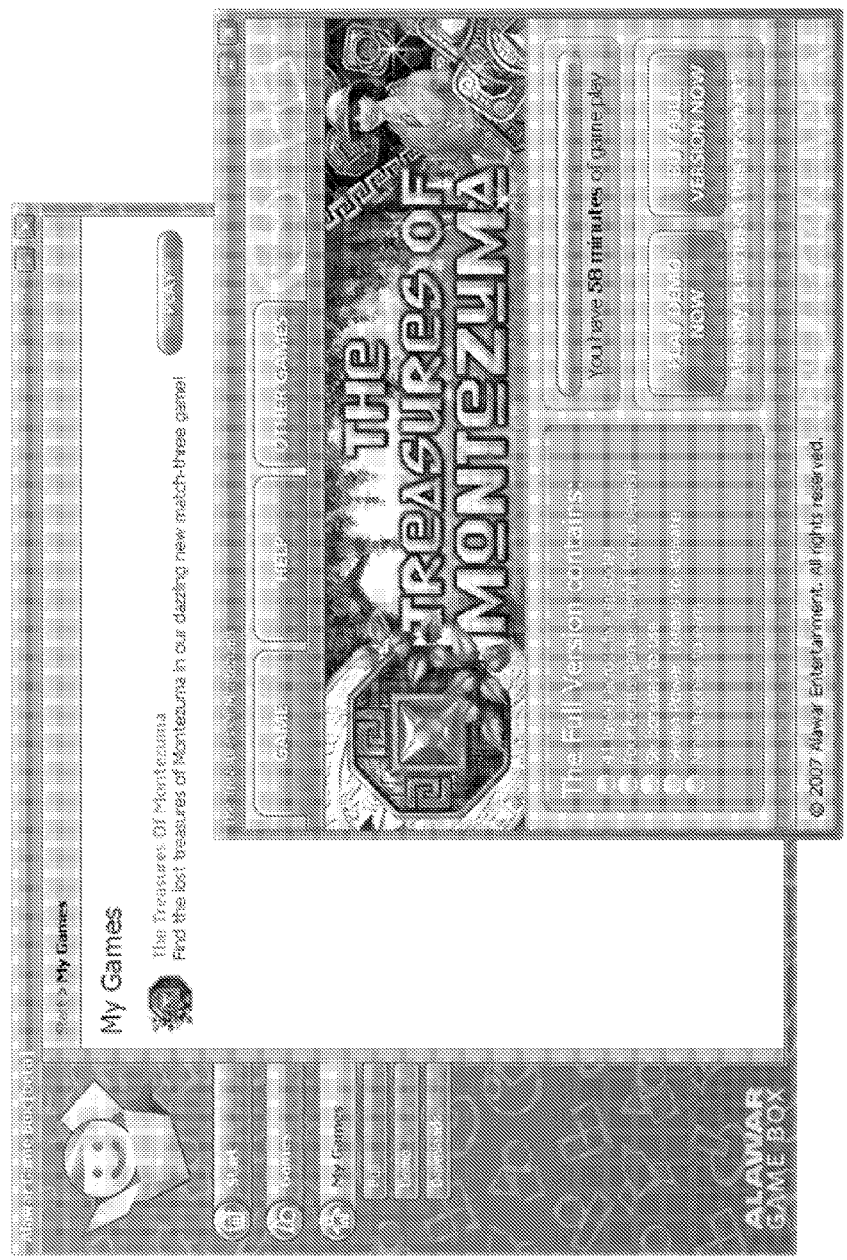
FIG. 5 illustrates a window of the ALAWAR GameBox shown in game launch.
Figure 6:
FIG. 6 illustrates a window that shows detailed information about a game, with an option to download a trial version and a full version.

FIGS. 2-6 are a set of screen shots that illustrate the graphical user interface seen by the user with the Alawar GameBox. FIG. 2 shows a screenshot of the ALAWAR GameBox main window. FIG. 3 shows a window that lists games. FIG. 4 illustrates an ALAWAR GameBox window with detailed information about a game. FIG. 5 illustrates a window of the Alawar GameBox shown in game launch. FIG. 6 illustrates a window that shows detailed information about a game, with an option to download a trial version and a full version.

Figure 7:
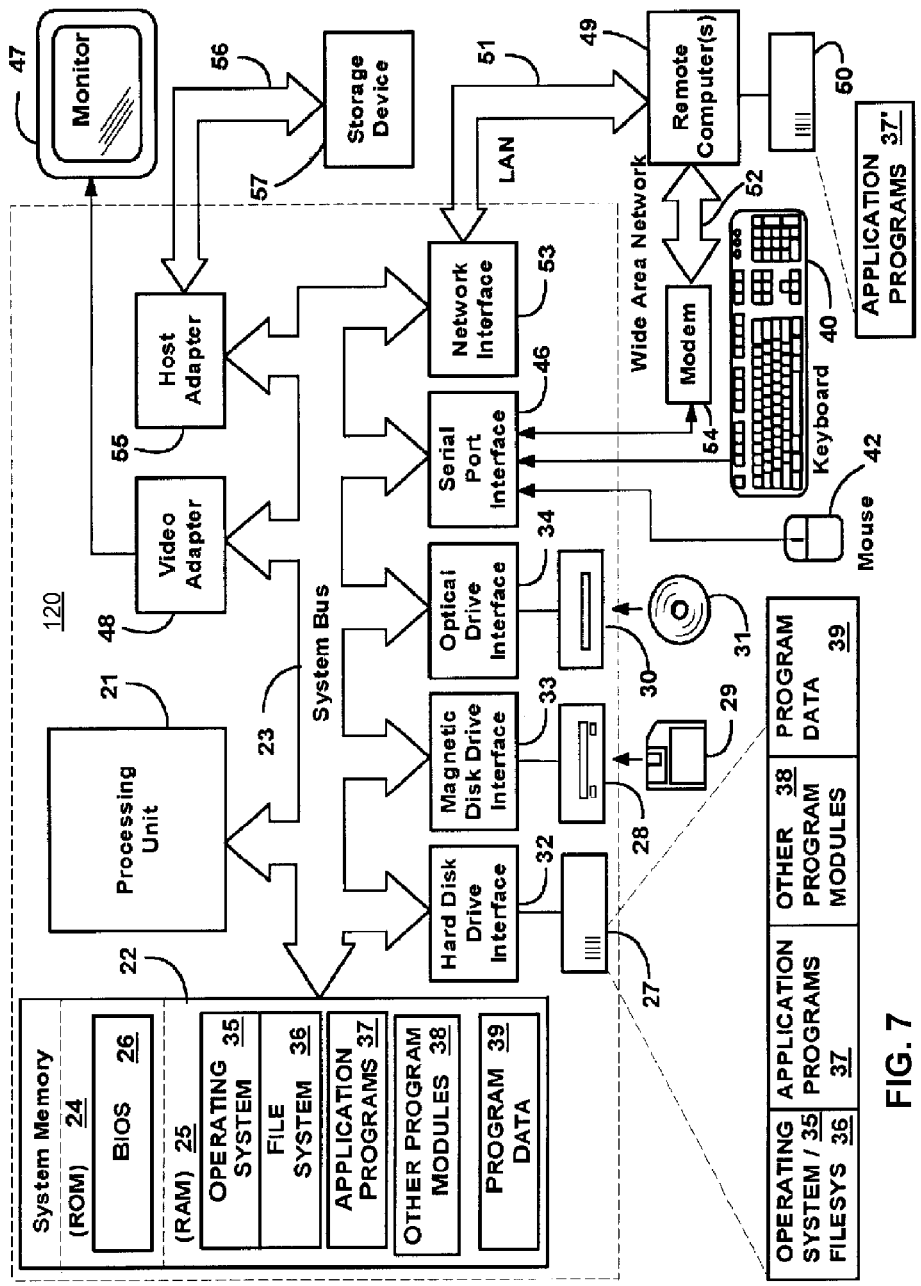
FIG. 7 illustrates an exemplary computer system on which the invention can be implemented.

With reference to FIG. 7, an exemplary computer system, where the invention can be implemented, includes a general purpose computing device in the form of a user-side computer and/or server-side computer 120 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 120, such as during start-up, is stored in ROM 24. The computer 120 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 120. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 120 includes a file system 36 associated with or included within the operating system 35, such as the Windows NT™ File System (NTFS), one or more application programs 37, other program modules 38 and program data 39. A user may enter commands and information into the computer 120 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 120 is connected to the local network 51 through a network interface or adapter 53. When used in a WAN networking environment, the computer 120 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 120, or portions thereof, may be stored in the remote memory storage device. It will be appreciated that the network connections shown are exemplary and other means of establishing a communications link between the computers may be used.

Having thus described a preferred embodiment of a system and method, it should be apparent to those skilled in the art that certain advantages of the described method and apparatus have been achieved. In particular, it should be appreciated by those skilled in the art that system and method described in the preferred embodiment provides efficient support for hardware virtualization. It should also be appreciated that various modifications, adaptations, and alternative embodiments thereof may be made within the scope and spirit of the present invention. The invention is further defined by the following claims.

What is claimed is:

1. A computer-implemented system for managing computer game activities, the system executing on a processor, the system comprising:
   a processor;
   a memory coupled to the processor;
   computer code loaded into the memory to implement the following functionality:
   a software module for interfacing to a user and receiving commands from the user;
   a plurality of games, each game including a wrapper that controls Digital Rights Management aspects of the user's access to the games;
   a plurality of skins stored in a local cache on a computer, the skins controlling visual aspects of presentations of the games, each skin being associated with a distributor who provided a particular game to the user; and
   wherein the software module periodically contacts a first server to update skins, games and user settings.

2. The system of claim 1, wherein at least one of the games was downloaded from a second server, and wherein the skin corresponding to that game is associated with the second server.

3. The system of claim 1, wherein the software module provides a mechanism for paying for games.

4. The system of claim 1, wherein the wrapper restricts the user to playing only a trial version of the game, unless the user pays for the full version of the game.

5. The system of claim 1, wherein the software module provides a mechanism for adding games that were previously installed to a list of games associated with the software module, and wherein the added games are handled the same as games that were downloaded through the software module.

6. The system of claim 1, wherein the skins include any combination of customizable fonts, colors, logos, text, and window shape.

7. The system of claim 1, wherein the software module periodically contacts the first server to receive updates to the games.

8. The system of claim 1, wherein the software module periodically contacts the first server to receive additional features for the games.

9. The system of claim 1, wherein the software module periodically contacts the first server to receive updates to its own code.

10. The system of claim 1, wherein the user settings are stored on the first server and permit the user to play the games from another computer.

11. A method for managing computer game activities, the method comprising:
   downloading a software module for interfacing to a user and receiving commands from the user;
   downloading a plurality of games, each game including a wrapper that controls Digital Rights Management aspects of the user's access to the games;
   storing a plurality of skins in a local cache on a computer, the skins controlling visual aspects of presentations of the games, each skin being associated with a distributor who provided a particular game to the user; and
   using the software module, periodically contacting a first server to update skins, games and user settings.

12. The method of claim 11, wherein at least one of the games was downloaded from a second server, and wherein the skin corresponding to that game is associated with the second server.

13. The method of claim 11, further comprising paying for the games through the software module.

14. The method of claim 11, wherein the wrapper restricts the user to playing only a trial version of the game, unless the user pays for the full version of the game.

15. The method of claim 11, further comprising adding games, using the software module, that were previously installed to a list of games associated with the software module, and wherein the added games are handled the same as games that were downloaded through the software module.

16. The method of claim 11, wherein the skins include any combination of customizable fonts, colors, logos, text, and window shape.

17. The method of claim 11, further comprising periodically contacting the first server to receive updates to the games.

18. The method of claim 11, further comprising periodically contacting the first server to receive updates to the software module.

19. The method of claim 11, further comprising storing the user settings on the first server and permitting the user to play the games from another computer.

20. A non-transitory computer useable recording medium having computer program logic stored thereon for executing on a processor, the computer program logic comprising:
   computer program code means for downloading a software module for interfacing to a user and receiving commands from the user;
   computer program code means for downloading a plurality of games, each game including a wrapper that controls Digital Rights Management aspects of the user's access to the games;
   computer program code means for storing a plurality of skins in a local cache on a computer, the skins controlling visual aspects of presentations of the games, each skin being associated with a distributor who provided a particular game to the user; and
   computer program code means for using the software module, periodically contacting a first server to update skins, games and user settings.

* * * * *